United States Patent [19]
Tschirky et al.

[11] 3,982,797
[45] Sept. 28, 1976

[54] SPRING-LOADED BEARINGS FOR IN-HOLE MOTORS

[75] Inventors: John E. Tschirky, Long Beach; Bela A. Geczy, Glendale, both of Calif.

[73] Assignee: Smith International Corporation, Inc., Newport Beach, Calif.

[22] Filed: July 11, 1975

[21] Appl. No.: 595,162

[52] U.S. Cl. ............................. 308/139; 308/8.2; 308/219
[51] Int. Cl.² .................. F16C 17/04; F16C 19/04
[58] Field of Search .............. 308/135, 140, 8, 9, 308/139, 8.2, 143, 145

[56] References Cited
UNITED STATES PATENTS

| | | | |
|---|---|---|---|
| 2,701,170 | 2/1955 | Reason et al. | 308/140 |
| 3,879,094 | 4/1975 | Tschirky et al. | 308/8 |
| 3,904,256 | 9/1975 | Pfeifer | 308/139 |

*Primary Examiner*—M. H. Wood, Jr.
*Assistant Examiner*—Richard A. Bertsch
*Attorney, Agent, or Firm*—Philip Subkow

[57] ABSTRACT

This invention relates to spring-loaded thrust bearings for shafts subject to a plurality of levels of thrust loads and in its preferred embodiment is applied to in-hole motors. The invention employs a plurality of spring systems, whereby the thrust load on one set of springs is limited to one level of thrust and another of the spring systems under said load may be loaded to a higher level.

18 Claims, 8 Drawing Figures

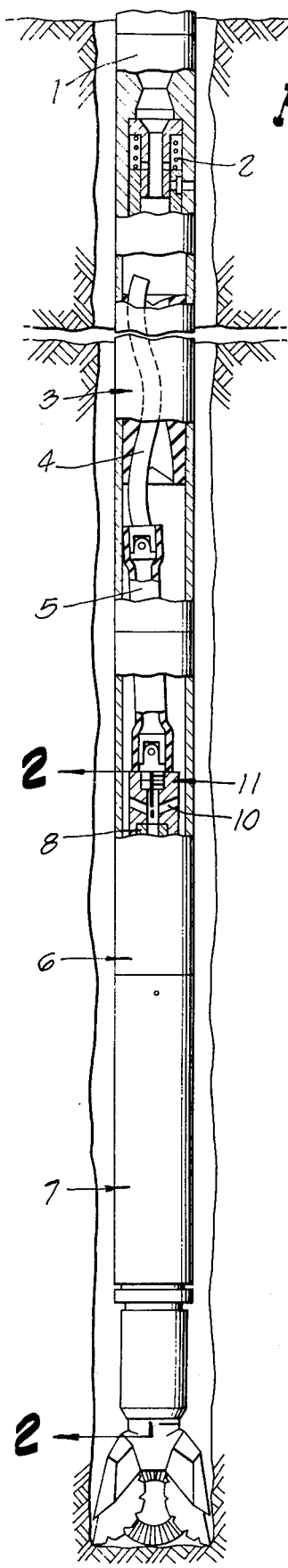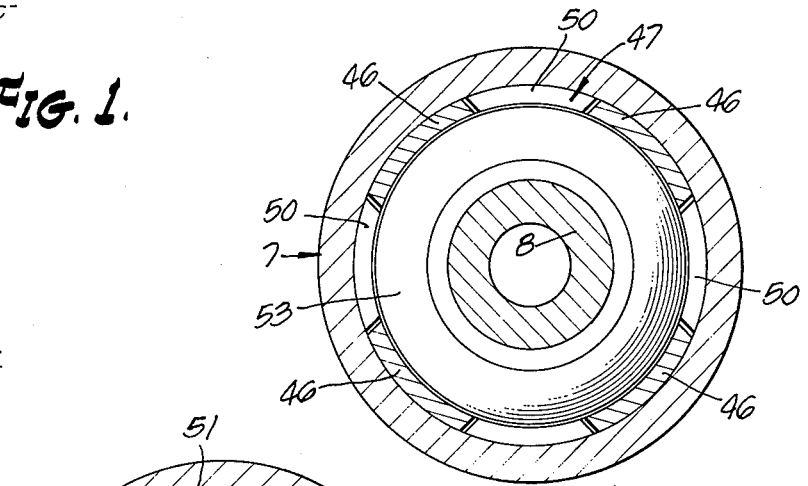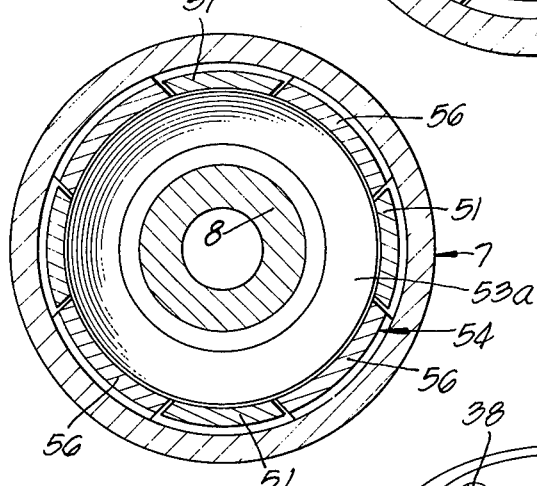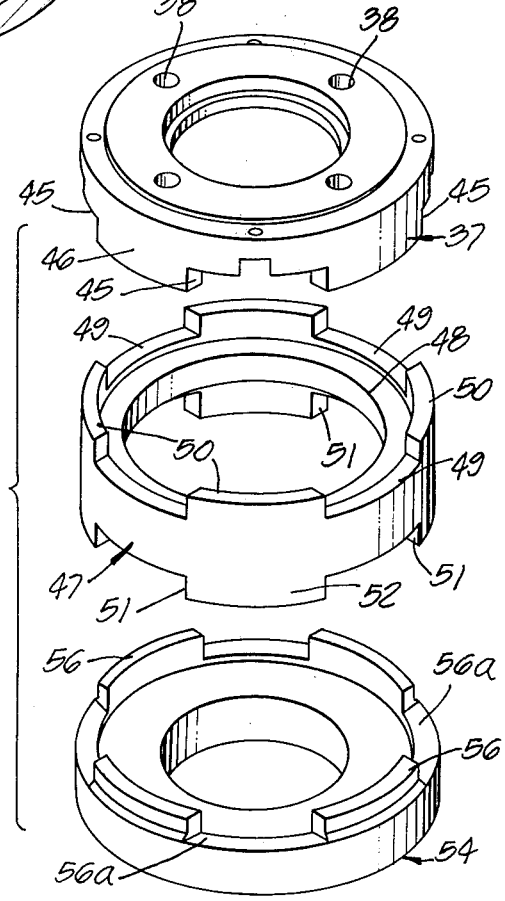

SPRING-LOADED BEARINGS FOR IN-HOLE MOTORS

BACKGROUND OF THE INVENTION

The use of in-hole motors in bore hole drilling, especially in drilling for oil and gas but also in mining operations, has been a standard procedure in the art. Such motors are employed to rotate drills for boring in the earth, both for forming a bore hole and also for coring. They may be electric motors or fluid-operated motors. The motors are also useful in oil-field operations, such as tube cleaning, milling operations, cement drilling, and other operations where it is desired to rotate a rod at the end of which a tool is to be rotated. We refer to such motors as in-hole motors when designed to be run at the end of a pipe and adjacent to the operating tool, such as the drill bit. In the usual case, the rotor of the motor and the tool rotate with respect to a stator. When used in connection with a bore hole drill, it is connected to a conventional drill string composed, in the case of the drilling of well bores, of a drill pipe and drill collar as required. This string extends to the surface and is suspended from drilling lines. The tension in the lines is controlled, and the weight of the drill string on the drill bit is controlled. Where the in-hole motor is a hydraulic motor used as an in-hole motor in drilling, the liquid is the usual drilling fluid, i.e., mud or gas. It serves its usual function in the drilling operation, returning to the surface carrying the detritus, i.e., cuttings resulting from the drilling operation. However, in this combination, the circulating mud has an additional function; and that is to supply the hydraulic power to operate the hydraulic motor.

One of the primary problems resides in the design of the bearing system which will permit operations for periods of economic length.

In hydraulic motors, such as those referred to in my U.S. Pat. No. 3,857,655, issued Dec. 31, 1974, as is the case in all usual drilling operations, the load on the drill bit when the drill is on bottom is controlled by the tension imposed on the drilling lines. This tension is a lifting force on the drill string which subtracts from the dead weight of the drill string. The net weight is imposed on the bit.

The resistance to rotation of the bit, resulting from friction against the wall of the bore and the drilling effort, depends on the magnitude of the weight imposed on the bit. The torque on the bit required to overcome this friction and provide the drilling effort depends, in the case of hydraulic motors, on the pressure drop across the system.

This pressure drop is that required to move the drilling fluid through the drill pipe, drill collars, hydraulic motor, and the bit nozzles. In operating the system, it is desirable to maintain a constant torque. In the usual operation, the magnitude of the torque is determined by the difference of the input pressure at the surface when the bit is off bottom and the pressure when the bit is drilling ahead. The operator in the usual procedure controls the tension on the drilling line to maintain a substantially constant pressure and consequent torque.

This control imposes variable thrust loads on the bit and the thrust bearings.

In the in-hole motors described in the above patent, the weight on the bit is imposed by the drill string on the stator and through spring-loaded bearings to the shaft connected to the drill.

When the drill is off bottom, the weight of the rotor and connecting rod, shaft, drill bit, and hydraulic thrust is imposed on the housing. The weight of the drill string is off the shaft and drill bit.

The spring loading of the bearings as has been described in a copending application Ser. No. 354,954 filed Apr. 27, 1973, now U.S. Pat. No. 3,894,818 has the function of providing an initial precompressing load which prevents the separation of the races when the washing load is not imposed and thus avoids the displacement of the roller or ball bearings. It also reduces the hammering effect of vibrations and longitudinal vibration imposed to which the drill bit is exposed in drilling.

In normal drilling operations, the loading in the thrust bearing is controlled to give the required rate of penetration of the bit. This is accomplished by the driller who controls the tension in the drilling lines. The weight on the bit is a residual portion of the dead weight load.

It is frequently found that loads imposed on the thrust bearings are considerably in excess of the drilling load. These include the usual vibratory forces occurring during the rotation of the bit when roller bits are used, as the bit rides off the teeth. This phenomenon is well known.

These and other vibratory forces usually encountered in drilling impose serious oscillatory forces upon the system. Occasionally, the load rises to a substantial degree as the bit drills through a softer formation into a hard formation.

The drilling rate reduces, and the driller will slacken off on his line to impose more weight to maintain his drilling rate.

When spring-loaded bearings are used, the imposition of such excess loads may load the springs beyond their safe limit.

It is an object of our invention to design a spring-loaded bearing system which may take such overloads without stressing any of the springs beyond their safe limit.

In such case, at the usual lower operating load, the stiff springs sufficient to take such loads may be too stiff to operate as a suitable shock absorber.

It is an object of our invention to employ a spring-loaded bearing system whereby at the lower operating load the bearings are spring loaded by a spring system of moderate stiffness so as to permit the spring to dampen longitudinal vibrating forces imposed on the bearings. The bearing system is transformed into a system of greater stiffness when the load exceeds the predetermined upper limit. The stiffness of the springs is chosen for each so that at the maximum loading to which they are to be exposed they are not unduly stressed. We accomplish this effect by designing the spring system so that the deflection of springs at the applied loads does not exceed a predetermined fraction of the maximum deflection which the spring system can encounter.

The spring-loaded bearing system of our invention employs a plurality of spring systems arranged in series. The springs are of different stiffness and are arranged so that on application of a load on the plural spring systems the total deflection up to a maximum load on the spring system is unequally divided between the series springs. The total deflection is the sum of the unequal deflections of the spring system of lesser stiffness and the deflections of the spring system of greater stiffness.

In order to limit the deflection of the springs so that they are not overly stressed, we provide a stop for the spring system of lesser stiffness to terminate the deflection of the spring of lesser stiffness at a value less than the total deflection of the entire plural series systems under the maximum load contemplated. The deflection of the second spring system of greater stiffness is also less than the deflection of the entire plural series system at the maximum load contemplated. A stop is provided to permit the stiffer spring to deflect an amount beyond that at which the deflection of the spring system of lesser stiffness is stopped.

A further improvement is attained by the use of an additional spring system so arranged that, when the third spring is compressed by suitable means, a precompression load is imposed on the spring system described above. When the bit weight is applied to the plural spring systems, the precompression load is reduced. The plural spring system is partially unloaded, reducing the deflection of the plural spring and the deflection of the system.

The precompression load is not removed entirely, and the thrust bearings are under sufficient spring load so that contact of the roller or ball bearings and the races is maintained.

The system in our preferred embodiment is employed in in-hole motors used in oil well operations (see said U.S. Pat. No. 3,857,655). The system in our preferred embodiment is composed of a first and a second spring system to transmit the load of the housing onto the shaft and drill bit when the drill bit is on bottom; and a third spring system transmits the load of the rotor, connecting rod, shaft assembly and the hydraulic thrust load when the drill bit is off bottom. The third spring system is employed to impose a precompression load on the first and second spring systems.

This invention will be further described by reference to the drawings of which:

FIG. 1 is a schematic view of a preferred application of my invention;

FIG. 3 is a section on line 3—3 of FIG. 2A;

FIG. 4 is a section on line 4—4 of FIG. 2B;

FIG. 5 is an exploded view of a detail of FIGS. 2A and 2B;

Figures 2A, 2B:
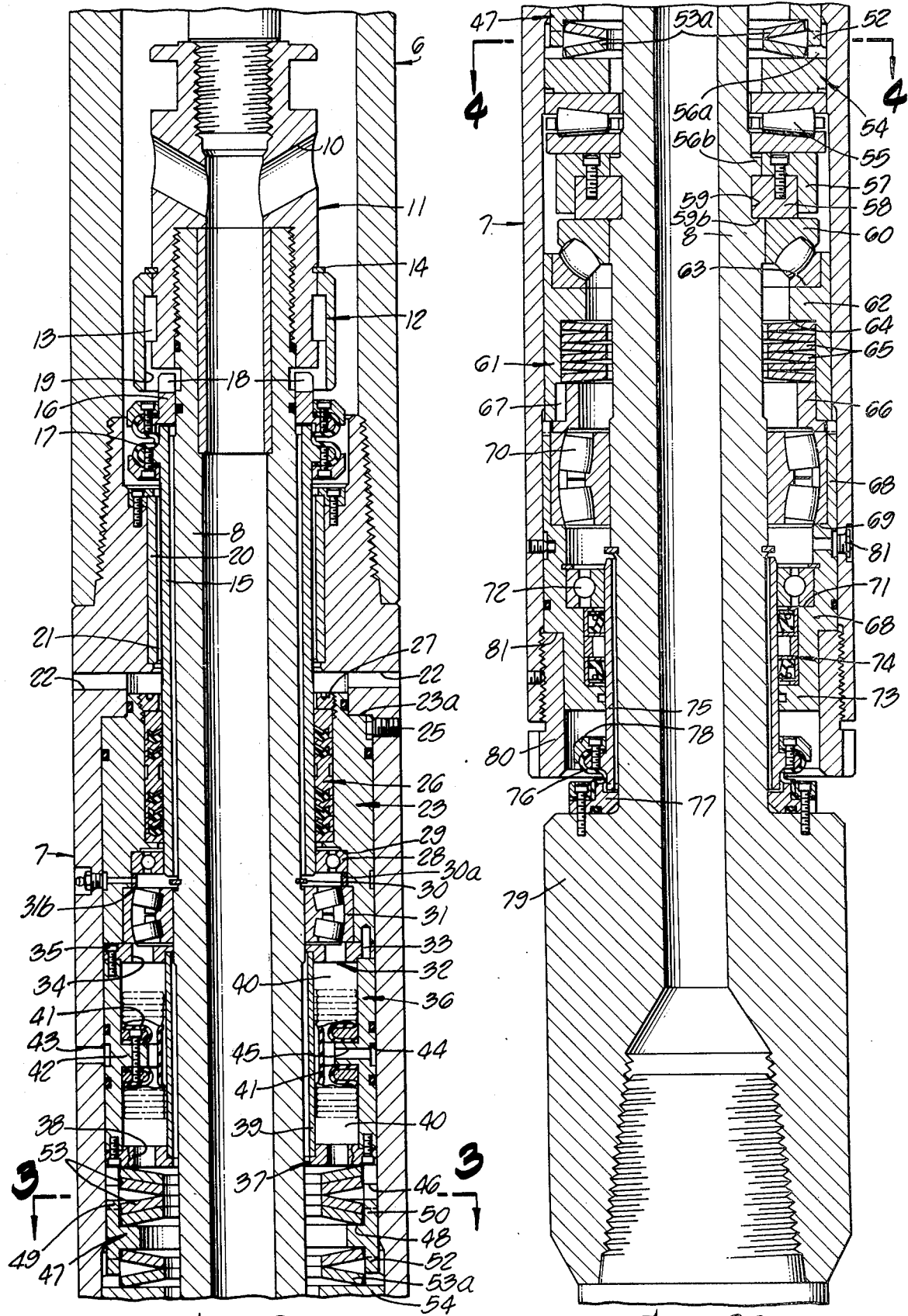
FIGS. 2A and 2B are a section on line 2—2 of FIG. 1.

The drill string 1 composed of a kelly, drill pipe, drill collar, suspended from a drilling rig (not shown) is connected through a conventional dump valve 2 to a stator 3 of a progressive cavity motor. The rotor 4 is connected through universal joints to the connecting rod 5. The connecting rod is connected through the universal joint by a screw connection to the drive shaft cap 11 (see FIG. 2A). The drive shaft cap 11 is screw connected to the hollow drive shaft 8 which, in turn, is connected to the bit (see FIGS. 1, 2A, and 2B).

The stator 3 is connected by a box and pin connection to connecting rod housing 6 which, in turn, is connected via a box and pin connection to the bearing housing 7.

The drive shaft cap 11 carries ports 10 connecting the interior of the cap 11 and hollow drive shaft with the interior of the connecting rod housing 6. The ring holder sleeve 12 is locked to the cap 11 by the keys 13 and the split retaining ring 14.

The flow restrictor inner sleeve 15 is connected to the ring 16 by a corrugated flexible circular boot 17 mounted on the sleeve 15. The ring 16 carried dogs 18 fitting in slots 19 in the ring 12 so that it may be flexibly connected to the shaft 8 for transverse displacement but rotatable with the shaft. The flow restrictor outer sleeve 20 is mounted on the interior of the bearing housing 7 at the pin end and is spaced radially from the sleeve 15. The details of the flow restrictor wear sleeve 20 are further described in the co-pending application Ser. No. 354,954, filed Apr. 27, 1973, now U.S. Pat. No. 3,894,818. Alternate forms of flow restrictors and wear sleeves may be used; for example, as shown in the aforesaid U.S. Pat. No. 3,857,655 or in co-pending application Ser. No. 433,284, filed Jan. 14, 1974, now U.S. Pat. No. 3,912,425, and Ser. No. 544,353, filed Jan. 27, 1975, now U.S. Pat. No. 3,936,247, in the name of one of us as joint inventor.

The drilling mud exiting from the stator passes through the ports 10 into and through the drive shaft and bit nozzles to be returned to the surface via the annulus between the drill string and the bore hole. A portion of the flow is bypassed around the sleeve 12 and boot 17 and through the annulus 21 between 15 and 20. The housing 7 is bored at 22 to connect the discharge end of the annulus 21 with the ambient space exterior of the housing via port 22.

The top seal sleeve 23 shoulders at 23a and is kept from rotating by set screw 25. Mounted between sleeve 15 and the sleeve 23 is a packing 26 in sealing contact with the sleeves 23 and 15. The packing is held against upward displacement by internal nut 27. The lower end of the packing 26 is seated on the ring shoulder 26a. Radial bearing 28 is positioned against the internal shoulder 29 of the sleeve 23. The sleeve 15 is held against transverse displacement at its lower end by the retaining ring 30 positioned on the drive shaft 8. Spacer sleeve 30a is seated between radial bearing 28 and radial bearing 31, which is positioned against shoulder 31a of the sleeve 23.

The plate 32 is pinned by pins 33 to the lower end of the sleeve 23 and is seated on and secured by studs 35 to the upper end of the lubricator housing sleeve 36. The plate 32 carries bores 34. The lower end of the sleeve 36 is connected to a cup 37 (see FIGS. 2A and 5) carrying bores 38. Mounted between the plate 32 and cup 37 is the interior lubricator housing sleeve 39 forming with the plate 32 and cup 37 and sleeve 36 an enclosed space 40.

The expandable bellows 41 is mounted on the interior bossage 42. The interior of the bellows is connected to the exterior of the housing 7 by port 43, circular groove 44, and port 45. For further details of the construction and function of the seal and lubricator, reference is made to the copending application Ser. No. 388,586, now U.S. Pat. No. 3,879,094.

Positioned beneath the cup 37 and in bearing contact therewith are the stacked Belleville spring washers 53 seated on bossage 48. Cup 37 is notched with a plurality of circumambient notches 45 in the dependent sleeve portion 46 of the cup 37. The floating sleeve 47 carries an internal bossage 48 and is notched at its upper end with a plurality of circumambiently positioned notches 49 between which are positioned upstanding sleeve portions 50. The lower end of the sleeve 47 is similarly notched at 51 with the depending sleeve portion 52 positioned between the notches 51.

The stacked Belleville spring washers 52a are positioned and in bearing contact with the under side of the bossage 48 and the bearing ring 54.

The bearing ring 54 (see FIG. 5) carries upstanding circular dogs 56 between which are positioned notches 56a.

The ring 54 sits on the thrust bearing 55 which sits on the thrust ring assembly 57 and on the bossage 59b on the drive shaft 8. The thrust ring 58 sits in the notch 59 on the drive shaft in bearing relation to the thrust bearing 60. The off-bottom bearing sleeve 61 carries a bossage 62 providing an upper shoulder 63 and a lower shoulder 64. The thrust bearing 60 is seated in thrust transfer relation on the shoulder 63 and the stacked Belleville spring washers 65 are positioned in thrust relation to the shoulder 64 and the spacer 66 keyed to 61 by key 67. The radial bearing 70 is positioned on the internal shoulder 69 of the sleeve 68 and underneath the spacer 66.

The lower sleeve assembly includes a radial bearing 72 mounted on the internal shoulder 71 of the sleeve 68, which carries the seal 74. The wear sleeve 75 is mounted on the bit sub 79 by means of the ring 77, flexible corrugated sleeve 76, and ring 78. The sleeve 75 is spaced radially from the shaft 8 and is in sealing contact with the seal 74.

When the motor and the connecting rod and shaft have been assembled and before connecting it to the drill string, the nut 80 is screwed against the shoulder 81. This introduces a thrust against 81 which is transmitted through 68 and bearing 70, spacer 66, springs 65, bossage 62 to the bearing 60 and against ring 58 in notch 59. This is a terminal point of the upward thrust imposed by the nut 80.

However, simultaneously as the nut enters the housing, the housing moves downward; that is, a thrust is imposed at the shoulder 23a (FIG. 2A) which is transmitted through 23 to 32 and via 36 to 37 and thus to the Belleville springs 53 and via the floating ring 47 and to Belleville springs 53a and via ring 54 and bearing 55 to the ring 58 which is thus the terminal end of the downward thrust.

The load imposed on the system of springs 53, 53a, and 65 is thus uniform.

In the position shown on FIG. 2A and 2B, the entire weight of the drill string, including the drill pipe, drill collar, stator 3 and housing 6 and 7 is on the drilling lines. The drill bit is off bottom. The load of the housing is off bearing 55. Circulation of drilling fluid continues.

The rotor, connecting rod, shaft and bit hang on the thrust bearing 60 via the thrust ring assembly 57 and 58. The precompression load imposed on the springs 53 and 53a also imposes an initial load on bearing 55 which thus prevents separation of the races when the load on the string is not on the bearing 55. The only load on the thrust bearing 55 is a portion of that which imposed the compression previously referred to.

When the drill string is lowered and as the bit touches bottom, the pump pressure rises as the thrust load is developed. When the pump discharge pressure at the inlet to the drill string rises to the level to develop the desired torque, the driller adjusts the lines to give him the level of pressure at which he will obtain the desired torque.

As he lowers the drill to bottom, the housings 3, 6 and 7 and spacer 66, sleeve 68, and seal 74 move downward relative to the shaft as they do relative to 61. The load comes off the bearing 60; the springs 65 are relieved of but a fraction of the pre-compression load. The residual load of springs 65 is thus applied to 60 to prevent the separation of the races and loss of the rollers in 60. It also prevents chatter in the bearing 60.

The load from the housing is applied via shoulder 23a to sleeve 23, plate 32, sleeve 36 and cup 37. The springs 53 are loaded, and the load is transmitted via 48 to the springs 53a. The spring rate of 53a is less than that of 53. The cup 37 moves downward as does the ring 47. The depending sections 52 enter notches 56a until they seat in the notches 56a. This is the terminal end of the compression because of the position of the bearing 55 on the ring 57. The load thus transferred is imposed on the bearing 55 and the shaft 8 (see FIG. 2B).

However, the cup 37 has not moved down sufficiently so that the upstanding portion 50 of ring 47 has not entered completely into notch 45 of the portion 46. Further loading is thus permissible, and the springs 53 deflect further until the portions 46 of cup 37 have bottomed in the notches 49 of ring 47.

Figure 7:
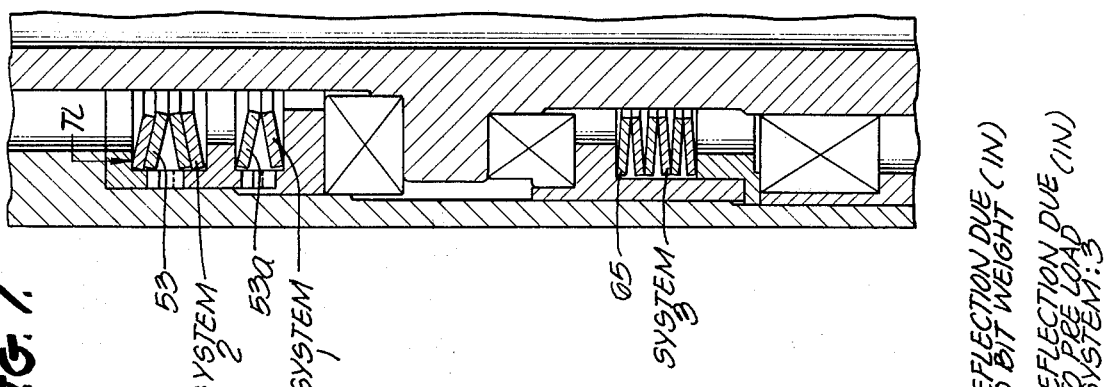
FIG. 7 is a partly schematic view of the spring system of FIGS. 2A and 2B.
Figure 6:
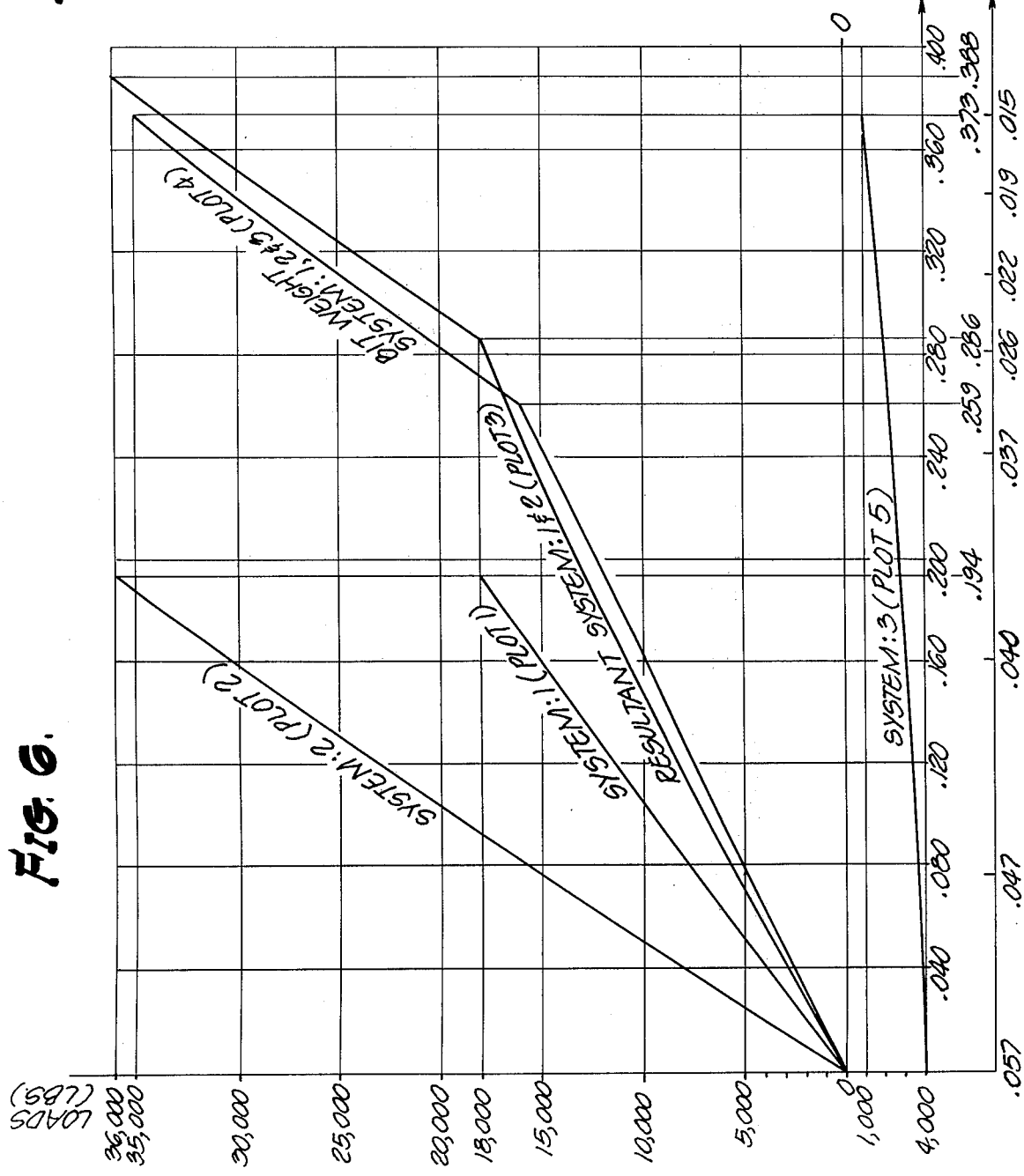
FIG. 6 is a diagram illustrating the principles of my invention.

FIGS. 6 and 7 and Table I illustrate a specific example of our invention.

The deflection (compression) of the springs 53, 53a, and 65 is tabulated in Table I. In the table, Column 1 is the weight imposed by the housing 7 on the shaft via the thrust bearing 55. Column 2 is the contribution to the compression of the springs resulting from the weight shown in Column 1. Column 3 is the magnitude of the thrust imposed by springs 65 at each level of load shown in Column 1. Column 4 is the contribution to the compression of the springs due to the thrust shown in Column 3 and imposed by the springs 65 at each level of load shown in Column 1. Column 5 is the total thrust on the springs 53 and 53a by the load as shown in Column 1 and the thrust of springs 65 as shown in Column 3. Column 6 is the total compression of the springs 53 and 53a resulting from the load imposed by the housing 7 and the thrust from springs 65 at each level of load shown in Column 1.

TABLE I

SPRING-LOADED BEARINGS FOR IN-HOLE FLUID MOTORS

| Column 1<br>Bit Weight<br>[Lbs.] | Column 2<br>Deflection Due<br>To Bit Weight<br>[In.] | Column 3<br>Preload Due To<br>System: 3<br>[Lbs.] | Column 4<br>Deflection Due<br>To Preload<br>[In.] | Column 5<br>Total Spring Load<br>On Systems: 1 & 2<br>[Lbs.] | Column 6<br>Total Deflection on<br>Systems: 1, 2, & 3<br>[In.] |
| --- | --- | --- | --- | --- | --- |
| 0 | 0 | 0 | 0 | 0 | 0 |
| 0 | 0 | 4,000 | .057 | 4,000 | 0.57 |
| 5,000 | .079 | 3,500 | .047 | 8,500 | .126 |
| 10,000 | .160 | 3,000 | .040 | 13,000 | .200 |
| 15,000 | .243 | 2,600 | .037 | 17,600 | .280 |
| 15,700 | .259 | 2,300 | .027 | 18,000 | .286 |
| 20,000 | .283 | 2,100 | .026 | 22,100 | .309 |
| 25,000 | .313 | 1,700 | .022 | 26,700 | .335 |
| 30,000 | .343 | 1,400 | .019 | 31,400 | .362 |

TABLE I-continued
SPRING-LOADED BEARINGS FOR IN-HOLE FLUID MOTORS

| Column 1<br>Bit Weight<br>[Lbs.] | Column 2<br>Deflection Due<br>To Bit Weight<br>[In.] | Column 3<br>Preload Due To<br>System: 3<br>[Lbs.] | Column 4<br>Deflection Due<br>To Preload<br>[In.] | Column 5<br>Total Spring Load<br>On Systems: 1 & 2<br>[Lbs.] | Column 6<br>Total Deflection on<br>Systems: 1, 2, & 3<br>[In.] |
|---|---|---|---|---|---|
| 35,000 | .373 | 1,000 | .015 | 36,000 | .388 |

The assumed condition is an in-hole motor which is to operate at a load on the drill bit of 15,700 pounds imposed by the drill string. The maximum bit weight imposed by the drill string for which the spring-loaded system is designed is 35,000 pounds with all load imposed through the housing (Table I, Column 1). The springs 53 and 53a have been initially precompressed by a force of 4,000 pounds (Table I, column 3) imposed via springs 65, and sleeves 66, 68 and nut 80 have introduced an initial deflection of 0.057 inch (Table I, column 4).

As the bit weight is applied through the housing 7 to the bearing 55 by adjustment of the drilling lines, the spacer 66 and sleeve 68 move downwards away from the shoulder 64. The compression load on springs 65 has thus been reduced partially, and this reduced force is transmitted through 62 to thrust bearing 55 and to the springs 53a and 53. When 15,700 pounds are applied to bearing 55, the precompression load is reduced to 2,300 pounds (Table I, Columns 1 and 3). The springs system 53 and 53a are then under compression force of 18,000 pounds (Table I, Column 5). The springs 53 and 53a have now been compressed by 0.259 inch (Table I, Column 2) due to the bit weight of 15,700 pounds (Table I, Column 1) plus 0.027 inch due to the preload (Table I, Column 4). The total amount of the relative movement of the housing 7 with respect to the drive shaft 8 is now 0.286 inch (Table I, Column 6). The further compression of springs 53a is prevented by the stop 56a (FIG. 5), when 52 bottoms in 56a. However, the load is applied through springs 53 so that the bearing 55 remains spring loaded. When the bit weight on the bearing 55 has reached 35,000 pounds (Table I, Column 1), the precompression load is reduced to 1,000 pounds (Table I, Column 3). The spring system 53 is now subjected to a compression force of 36,000 pounds (Table I, Column 5). The spring 53 is now compressed 0.373 inch (Table I, Column 2) due to the bit weight, plus 0.015 inch due to the preload (Table I, Column 4). The total amount of the relative movement of the housing 7 with respect to the drive shaft 8 is now 0.388 inch (Table I, Column 6). At this point, the dogs 46 bottom in the notches 49 and the bearing 55 is dead weight loaded by the drill string.

FIG. 6 is a graph of this action as shown in Table I. Plot 1 illustrates the assumed spring system 1, the softer spring 53a. The assumed spring rate is 92,750 pounds per inch deflection. Plot 2 illustrates the assumed spring system 2, the stiffer spring 53. The assumed spring rate is 185,500 pounds per inch. Plot 3 illustrates the deflection of the system composed of springs 53a and 53. When a bit weight of 15,700 pounds is applied, the springs 53a and 53 see a load of 18,000 pounds, the difference of 2,300 pounds representing precompression loading. This is illustrated by Plot 4 which illustrates the load imposed by the housing plus the precompression load as the load on the bearing rises, and the precompression load is reduced by the relative movement of the housing and the drive shaft 8. The springs have deflected a total of 0.286 inch as a result of the force imposed by the housing of 15,700 pounds and the residual precompression force of 2,300 pounds.

Plot 5 is a plot of the modulus of the spring system 3 and plots the thrust of spring 65 on the springs 53 and 53a against the contribution to the deflection of springs 53 and 53a as shown in Column 4 and against the total deflection of the springs as shown in Column 6.

As will be seen, the modulus (spring rate) is not an absolutely constant value. The plots on FIG. 6 are not linear, but the deviation from linearity is a second order value; and, for practical purposes, the modulus may be taken as constant over the range of values plotted or tabulated.

As will be seen, in the region of 0-14 15,700 pounds of bit weight, the spring system composed of the springs 53a and 53 has an effective spring rate of 62,940 pounds per inch (see plot 3). This is about 67.8% of the spring rate of the softer spring 53a and about 33.9% of the spring rate of the stiffer spring 53. In the range above 15,700 pounds of bit weight, the system becomes much stiffer than it was in the range below 15,700 pounds. The effective stiffness of the system of springs 53a and 53 is 161,200 pounds per inch, which is somewhat less than that of the spring 53, i.e., 185,500 pounds per inch, i.e., about 87% (see plots 2 and 3).

It will be observed that the modulus of the spring system expressed as pounds imposed through the housing versus housing advance expressed as compression of the system of springs 53 and 53a is substantially less than that of the individual components.

The advantages of the greater permissible movement of the housing in imposing the load permitted by the spring system by employing the spring system of my invention are many. The system is a softer system for like loading than can be obtained from either springs 53 of 53a acting alone. The reduction in modulus which gives a softer spring system improves the shock absorber action of the system.

Another useful consequence of the system is that for like loading the deflection is increased over that obtained from the use of springs 53 or 53a. The increase in deflection permitted by the combined action of the springs 53 and 53a permits of greater tolerances in the construction.

The action of the spring 65 adds to the permissible deflection and imposes an initial compression load when the load of the housing is off the thrust bearing. This avoids the possible separation of the races from the rollers.

Another advantage the decreased stiffness of this system has over one employing springs 53 or 53a alone is the increased sensitivity in applying the pre-load. As will be seen, at a pre-load of 4,000 pounds, the deflection of spring 53 acting alone is approximately 0.020 inch and the deflection of spring 53a acting alone is approximately 0.040 inch. The combined action permits a displacement of 0.057 inch. Machine tolerances are such that the increased deflection is an advantage in the adjustment of the nut 80 (FIG. 2B).

The system is designed so that the springs cannot be stressed to their maximum load capacity. In the case of the Belleville springs, the desired deflection should not exceed 0.75 times the maximum deflection the springs can take, i.e., flat position. In the case of coil springs, it is 80% of the maximum deflection.

The aforesaid example illustrates one application to a particular motor. The magnitude of the various parameters will vary with the intended use and dimensions. The spring rates, i.e., stiffnesses, as well as the required total deflection of each of the springs 53, 53a, and the magnitude of the pre-load of spring 65 depend on the size of the equipment and the level of the loading for which the system is designed.

As presently preferred for the system as described, the ratio of the spring rate of spring 53 to spring 53a is about 1.25:1 to about 5:1, for example, 2:1, and the magnitude of the maximum deflection for this example is about 0.194 inch, with a total deflection for spring systems 53 and 53a of about 0.388 inch.

We claim:

1. A spring-loaded thrust bearing system comprising a load-applying member, a load-receiving member, said members movable longitudinally relative to each other from an unload position to a load-applying position to said load-receiving member for application of a load, a thrust bearing between said members in thrust-bearing relation between said members, a plurality of springs arranged in series between one of said members and said thrust bearing, said springs positioned to transmit said thrust through said springs to said bearing, said plurality of springs including a first of said springs, a first stop associated with said first springs, said first stop interrupting the deflection of the first spring upon application of a fraction of the load but less than the total load to be applied by said load-applying member and at a portion of the available deflection of said spring of said first spring, a second spring, a second stop for said second spring, said stop interrupting the deflection of said second spring at an applied load greater than said fraction, said second spring deflecting through a portion of but less than the total of the available deflection of said second spring, the deflection of each spring being a fraction of the total movement of said load-applying member to said load-receiving member and the modulus of said first and second spring being substantially different.

2. The bearing system of claim 1 in which the modulus of the first spring is about one-half of that of the second spring.

3. The thrust-bearing system of claim 1, a third spring means to apply a compression load to said third spring, means to transmit said compression load to said first and second springs, means to reduce the compression of said third spring and to increase the compression of said first and second springs when the said load is applied by said members.

4. The bearing system of claim 3 in which the modulus of the first spring is about one-half of that of the second spring.

5. The thrust bearing system of claim 3 in which the ratio of the modulus of said first and second spring is from about 1.25 to about 5.

6. The bearing system of claim 5 in which the modulus of the first spring is about one-half of that of the second spring.

7. The thrust-bearing system of claim 5, a third spring means to apply a compression load to said third spring, means to transmit said compression load to said first and second springs, means to reduce the compression of said third spring and to increase the compression of said first and second springs when the said load is applied by said members.

8. The bearing system of claim 7 in which the modulus of the first spring is about one-half of that of the second spring.

9. The thrust bearing system of claim 7 in which the ratio of the modulus of said first and second spring is from about 1.25 to about 5.

10. The bearing system of claim 9 in which the modulus of the first spring is about one-half of that of the second spring.

11. An in-hole motor comprising a motor, including a stator and a rotor, a drive shaft connected to said motor, a housing for said drive shaft connected to said stator, a spring-loaded thrust bearing positioned between said shaft and said housing, said housing and said shaft movable longitudinally relative to each other from an unload position to a load-applying position to said shaft for application of a load to said thrust bearing, a plurality of springs arranged in series between one of said shaft and housing in thrust relation to said thrust bearing, said springs positioned to transmit said thrust through said springs to said thrust bearing, said plurality of springs including a first of said springs, a first stop associated with said first springs, said first stop interrupting the deflection of the first spring upon application of a fraction but less than the total of the load to be applied by said load-applying member and at a portion of the available deflection of said spring of said first spring, a second spring, a second stop for said second spring, said stop interrupting the deflection of said second spring at an applied load greater than said fraction, said second spring deflecting through a portion of the available deflection of said second spring, the deflection of each spring being a fraction of the total movement of said housing to said shaft and the modulus of said first and second spring being substantially different.

12. The in-hole motor of claim 11, in which said motor is a hydraulic motor, connected to one end of a drill pipe and a drill bit connected to said shaft.

13. The bearing system of claim 12 in which the modulus of the first spring is about one-half of that of the second spring.

14. The bearing system of claim 11, in which the modulus of the first spring is about one-half of that of the second spring.

15. The thrust-bearing system of claim 11, a third spring means to apply a compression load to said third spring, means to transmit said compression load to said first and second springs, means to reduce the compression of said third spring and to increase the compression of said first and second springs when the said load is applied by said housing.

16. The thrust bearing system of claim 15 in which the ratio of the modulus of said first and second spring is from about 1.25 to about 5.

17. The bearing system of claim 16 in which the modulus of the first spring is about one-half of that of the second spring.

18. The bearing system of claim 16 in which the modulus of the first spring is about one-half of that of the second spring.

* * * * *